United States Patent [19]

Maxwell

[11] Patent Number: 4,471,012
[45] Date of Patent: Sep. 11, 1984

[54] SQUARE-EDGED LAMINATED WOOD STRIP OR PLANK MATERIALS

[75] Inventor: Thomas V. Maxwell, Warren, Ark.

[73] Assignee: Masonite Corporation, Chicago, Ill.

[21] Appl. No.: 379,620

[22] Filed: May 19, 1982

[51] Int. Cl.³ .............. B32B 5/12; B32B 23/02; B32B 31/00

[52] U.S. Cl. .................... 428/106; 144/347; 156/258; 428/47; 428/48; 428/50; 428/58; 428/60; 428/192

[58] Field of Search ............... 428/106, 60, 58, 50, 428/48, 47, 192; 144/347; 156/258

[56] References Cited

U.S. PATENT DOCUMENTS

| | | | |
|---|---|---|---|
| 1,924,240 | 8/1933 | Harwell | 144/347 |
| 1,947,395 | 2/1934 | Hutchings | 144/347 |
| 2,263,930 | 11/1941 | Pasquier | 428/106 |
| 3,074,448 | 1/1963 | Brown | 144/347 |

FOREIGN PATENT DOCUMENTS 50374 7/1935 Denmark ............ 144/347

Primary Examiner—William R. Dixon, Jr.
Attorney, Agent, or Firm—Mason, Kolehmainen, Rathburn & Wyss

[57] ABSTRACT

Laminated wood strip or plank flooring members are disclosed having adjacent edges of adjacent strip or plank members slightly reverse-beveled, i.e. 2° to 7° from vertical, to tightly fit together to provide precise, flush contact between adjacent upper surfaces of adjacent strips or planks. The strip or plank wood materials are provided in various lengths and various predetermined widths so that the random width and length strip or plank materials can be fitted together to provide a most unexpected and pleasing appearance wherein each adjacent strip or plank member is precisely fitted together and adjacent surface portions are substantially flush, or in contact.

17 Claims, 5 Drawing Figures

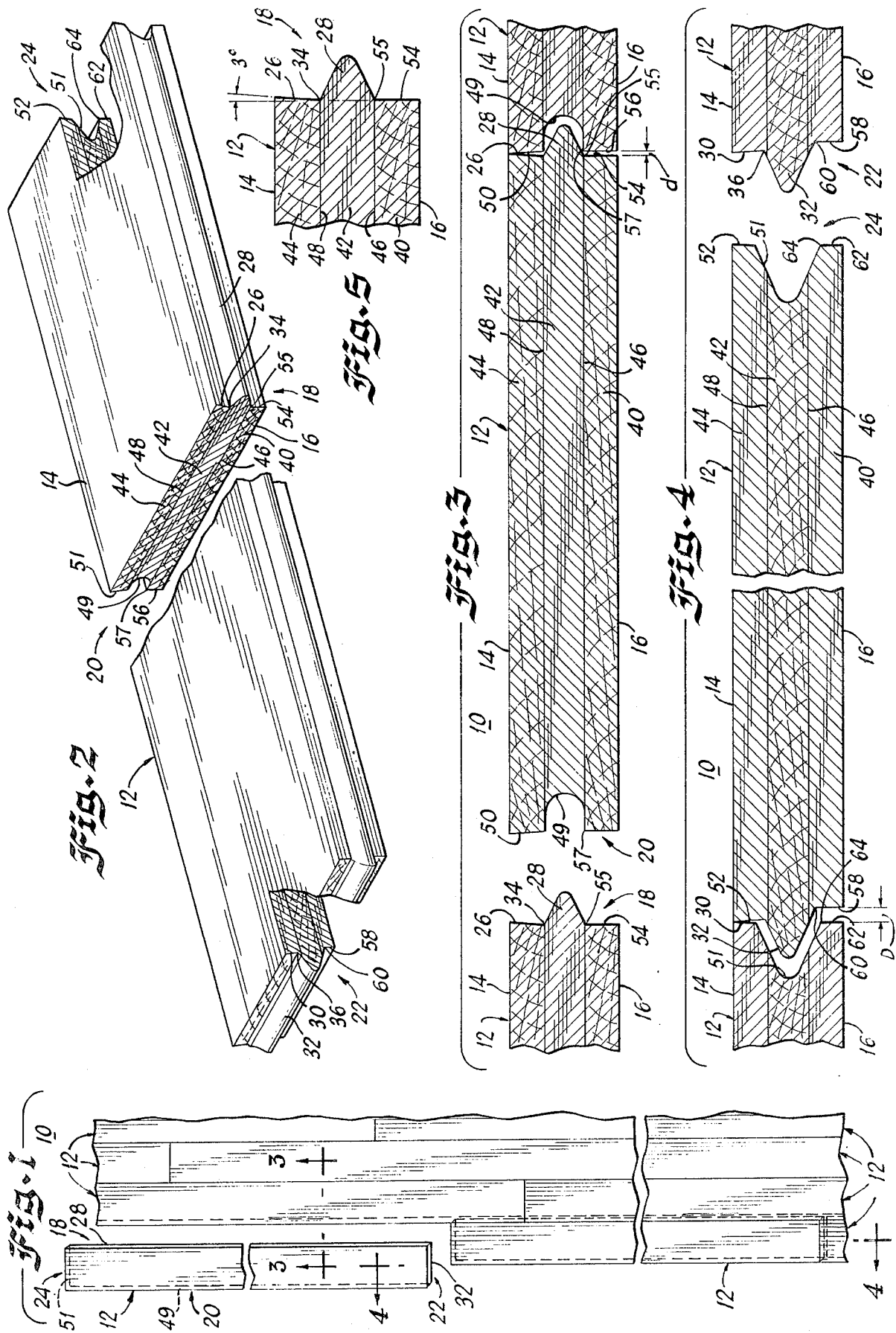

SQUARE-EDGED LAMINATED WOOD STRIP OR PLANK MATERIALS

FIELD OF THE INVENTION

The present invention relates to square-edged laminated wood strip or plank members particularly useful as wood flooring material and having tongue and groove fittings to assure that top surfaces of adjacent strips of planks will be substantially flush, one against the other.

BACKGROUND OF THE INVENTION AND PRIOR ART

Various wood flooring materials have been manufactured including laminated wood, wood strip or plank flooring, parquet blocks, and the like. Generally, when a wood flooring material, i.e., strip flooring, is not laminated, a sub-flooring or underlament material first must be applied as a support for the wood flooring material to take into account expansion and contraction as a result of varying temperature and humidity conditions so the wood flooring material does not separate from the layer immediately beneath. Laminated wood flooring materials, on the otherhand, do not substantially expand and contract with changes in temperature and humidity conditions because the veneers or layers of wood are laminated together in a cross-grained fashion to prevent most of the expansion and contraction.

Generally, strip and plan flooring materials of the prior art beveled at their adjacent edges to provide a space between strips or planks at the uppermost surfaces because of inability of the prior art flooring material to provide precise, flush fittings on the uppermost edges of the flooring materials. Adjacent edges of prior art adjacent strips or planks of wood flooring material have been beveled in manufacture so that spaces are left between adjacent strips or planks and, in this manner, slightly different spacings between upper surfaces of adjacent strips or planks are not as noticeable.

SUMMARY OF THE INVENTION

In accordance with the present invention, it has been found that by providing laminated wood strip or plank flooring members in which the adjacent edges of adjacent strip or plank members are slightly reverse-beveled, the adjacent edges of adjacent strip or plank members tightly fit together to provide precise, flush contact between adjacent upper surfaces of adjacent strips or planks. The strip or plank wood materials of the present invention are provided in various lengths and various predetermined widths so that the random width and length strip or plank materials can be fitted together to provide a most unexpected and pleasing appearance wherein each adjacent strip or plank member is precisely fitted together and adjacent surface portions are substantially flush, or in contact. In one embodiment of the present invention, the strip or plank is provided as a laminate with the cross-grained adjacent layers or veneers, and substantially only the center veneer is grooved or tongued to provide precise fittings of adjacent strip or plank members having upper surfaces lying in the same plane.

Accordingly, an object of the present invention is to provide wood strip or plank members having tongue and groove fittings for precise, flush fitting of adjacent wood members so that surface portions of adjacent strip or plank members can be fitted together precisely and surface edge portions are substantially flush to prevent uneven spacing between adjacent wood members.

Another object of the present invention is to provide a laminated wood strip or plank member having tongues and grooves therein for precise connection to an adjacent laminated wood strip or plank member wherein an upper or surface veneer of each strip or plank member is back-beveled or reverse-beveled along at least one edge of the strip or plank member. In this manner the upper surface edge of the beveled edge contacts an adjacent strip or plank member for precise and flush fitting at the surface of an adjacent strip or plank member.

Still another object of the present invention is to provide wood strip or plank flooring materials having tongue and groove edges beveled so that adjacent strip or plank members are in contact substantially only at their surfaces.

These and other objects and advantages of the present invention will be apparent from the following detailed description of the invention described with reference to the drawing, wherein:

BRIEF DESCRIPTION OF THE DRAWING

FIG. 1 is a broken-away elevational view of a floor portion constructed from a plurality of strip or plank wood members manufactured in accordance with the principles of the present invention.

FIG. 2 is an enlarged, broken-away elevational view of a wood strip or plank member of FIG. 1;

FIG. 3 is an enlarged, cross sectional view of the floor portion of FIG. 1 taken along line 3—3 of FIG. 1;

FIG. 4 is an enlarged, cross sectional view of the floor portion, taken along line 4—4 of FIG. 1;

FIG. 5 is a broken-away, enlarged, elevational view of a portion of a wood floor member showing a reverse-beveled, precision-fit edge of the wood strip or plank member of the present invention.

DETAILED DESCRIPTION OF THE INVENTION

Disclosed is a wood strip or plank member having a tongue member extending centrally outwardly from two edges and a groove formed centrally within another two edges wherein at least one edge is a machined edge including a reverse bevel machined in said edge downwardly and inwardly from a major flat surface of said member to said extending tongue or groove.

Referring now to the drawing, and initially to FIG. 1, there is illustrated a new and improved floor, generally designated by reference numeral 10, comprising a plurality of adjacent wood strip or plank members, generally designated by reference numeral 12, fitted together with tongue and groove fittings.

Referring now to FIGS. 2-4, each of the wood strip or plank members 12 includes an upper major surface 14; a lower major surface 16; a side tongued edge, generally designated by reference numeral 18; a grooved side edge, generally designated by reference numeral 20; a tongued end edge, generally designated by reference numeral 22; and a grooved end edge, generally designated by reference numeral 24.

In accordance with an important feature of the present invention, the side tongued edge 18 includes a precision-fit edge surface 26 machined above a side edge tongue member 28 and the end tongued edge 22 includes a precision-fit end edge surface 30 disposed above the extending end edge tongue member 32. The precision-fit side edge 26 and the precision-fit end edge 30, as shown in FIGS. 3-5, are machined to slope downwardly and inwardly from the upper major surface 14 toward uppermost and innermost edges 34 and 36 of side edge tongue member 28 and end edge tongue member 32, respectively. The precision-fit side edge surface 26 is machined to slope downwardly and inwardly from the upper major surface 14 to the uppermost and innermost edge 34 of the tongue member 28, as shown in FIGS. 3 and 5, at an angle of 2° to 7° from vertical. The precision-fit end edge surface 30 is machined to slope downwardly and inwardly from the upper major surface 14 to the uppermost and innermost edge 36 of tongue member 32, as shown in FIG. 4, at an angle of 2° to 7° from vertical. The precision-fit side and end edges 34 and 36, respectively, allow for precise joining of adjacent strip or plank members 12 by permitting adjacent strip or plank members to come in contact substantially only at their major surfaces 14 along the tongued side edge 18 and the tongued end edge 22, as shown in FIGS. 3 and 4. Accordingly, there will be no measurable space between adjacent strip or plank members 12 where two plank members 12 join in contact at their upper major surfaces 14.

In accordance with another important feature of the present invention, the precision-fit edges 26 and 30 are back-beveled or reverse-beveled at an angle of 2° to 7°, preferably 2¼° to 3¼°, from vertical. It has been found that a bevel less than about 2° may still include a number of wood imperfections or impreciseness in machining to impede flush contact of the upper major surfaces 14 of adjacent strip or plank members 12. A reverse-bevel greater than about 7° has been found to weaken the upper surface 14 of the strip or plank member 12 at the upper edge of the precision-fit edges 26 and 30 so that the precision fit edges 26 and 30 might be damaged at the upper major surface 14 by being compressed inwardly during handling or installation. To achieve the full advantage of the present invention, the reverse-bevel should be at an angle of 2° to 4° from vertical, preferably 2¼° to 3¼° from vertical.

In accordance with another important embodiment of the present invention, the wood strip or plank members 12 are manufactured from a plurality of layers or veneers of wood: a bottom layer 40, a central layer 42, and an upper layer 44 adhesively secured together at interfaces 46 and 48, as shown in FIG. 2. Adjacent veneers 40 and 42; 42 and 44 are secured together so that the grain direction of bottom layer 40 is at substantially a right angle to the grain direction of central layer 42 and grain direction of top layer 44 also is at substantially a right angle to the grain direction of central layer 42 to achieve greater strength to the wood strip or plank member 12 and to decrease the amount of expansion, contraction and warping ordinarily inherent in wood objects as a result of differences in temperature and humidity conditions.

In accordance with an important feature of the present invention, as shown in FIGS. 2-5, a centerline of the side and end tongue members 28 and 32 and a centerline on side groove 49 and end groove 51 correspond to a centerline of the thickness of the wood strip or plank member 12. To achieve the full advantage of the present invention, the tongues 28 and 32 and the side groove 49 are centrally machined in only the center veneer 42 to ensure that the tongues 28 and 32 fit precisely within the grooves 49 and 51 while maintaining the upper major surfaces 14 on adjacent planks in the same plane when adjacent planks are fitted together. Another advantage of machining the tongues 28 and 32 and the side groove 49 from substantially only the center veneer is that machining can be performed more easily and precisely since the machined portion is grained in a single direction.

In accordance with an important feature of the present invention, end groove 51 is machined in the center veneer 42 as well as the lower veneer 40 and upper veneer 42 to provide an expanded end groove 51 for receiving an end tongue member 32, as shown in FIG. 4, so that end tongue edge 22 and end grooved edge 24 contact substantially only at the upper surfaces 14.

In accordance with another important feature of the present invention, the grooved side edge 20 and the grooved end edge 24 also can be provided with precision-fit edge surfaces 50 and 52, respectively, as shown in FIGS. 3 and 4. The precision-fit edge surfaces 50 and 52 on side grooved edge 20 and end grooved edge 24 are back-beveled or reverse-beveled in the same manner as the precision-fit edges 26 and 30 on side tongued edge 18 and end tongued edge 22. Accordingly, the precision-fit edges 50 and 52 are beveled at an angle of 2° to 7° from vertical downwardly and inwardly, angled from the upper major surface 14 to the grooves 49 and 51, as shown in FIGS. 3 and 4. In this manner, the extending tongue members 28 and 32 will float freely within the grooves 49 and 51, as shown in FIGS. 3 and 4, where adjacent planks are fitted together to contact adjacent precision-fit beveled edges together for contact. Contact is made between adjacent strips or planks 12 substantially only at the upper major surfaces 14.

In accordance with another important feature of the present invention, a side edge surface 54 (FIG. 3) is machined into side edge 18 in the lower veneer 40 from a lowermost edge 55 of the side tongue member 28 to the lower surface 16 of the wood strip or plank member 12 to provide a space "d" between side edge surface 54 in side tongued edge 28 and an adjacent side edge surface 56 (in the side grooved edge 20) disposed below a lowermost edge 57 of the side edge groove 49. Obviously, the side edge surface 56 can be machined as well as, or instead of, side edge surface 54 to provide the spacing "d" between the lower major surfaces 16 of adjacent strip or plank members 12, for example 1/16 inch.

Similarly, and in accordance with another important feature of the present invention, an end edge surface 58 is machined into end edge 22 (FIG. 4) in the lower veneer 40 from a lowermost edge 60 of the end tongue member 32 to the lower surface 16 of the wood strip or plank member 12 to provide a space "D", for example ⅛", between end edge surface 58 in end tongued edge 22 and an adjacent end edge surface 62 (in the end grooved surface 24) disposed below a lowermost edge 64 of the end edge groove 51. Again, end edge surface 62 can be machined as well as, or instead of, end edge surface 58 to provide the spacing "D" between the lower major surfaces 16 of adjacent strip or plank members 12.

Generally, the strip or wood strip or plank members of the present invention are laminated to a thickness of at least about ⅜ inch and preferably at least ½ inch so that the upper major surface 14 can be sanded and refinished as desired.

While the above described invention has been described with respect to specific embodiments, certain modifications would be obvious to those skilled in the art and are intended to be included within the scope hereof .

What is claimed as new and desired to be secured by Letters Patent of the United States is:

1. A wood strip or plank member having a tongue member extending centrally outwardly from two edges and a groove formed centrally within another two edges wherein at least one edge is a machined edge including a reverse bevel machined in said edge downwardly and inwardly from a major flat surface of said strip or plank member to said extending tongue or groove, said tongued edge and grooved edge machined such that the tongue member of an adjacent strip or plank floats freely within said groove without substantially contacting the internal machine surfaces defining the groove.

2. The strip or plank of claim 1 wherein said bevel comprises a machined angle of at least 2° from vertical inwardly into said machined edge.

3. The strip or plank of claim 2 wherein said machined angle comprises 2° to 7° from vertical.

4. The strip or plank of claim 3 wherein said machined angle comprises $2\frac{1}{2}°$ to $3\frac{1}{2}°$ from vertical.

5. The strip or plank member of claim 1 wherein said member comprises a plurality of layers of wood adhesively secured together so that grain directions of adjacent layers are substantially at right angles to the other to form a laminate.

6. The strip or plank of claim 5 wherein said member comprises a bottom layer, a middle layer, and a top layer laminated together such that a grain direction of said middle layer is at substantially a right angle with respect to a grain direction of said bottom layer and said top layer, and wherein said tongue members are formed substantially entirely from said middle layer.

7. The strip or plank of claim 6 wherein said tongue members extend outwardly from said edges of said strip or plank member a distance less than a depth of said grooves to enable said top surfaces of adjacent panels to contact each other.

8. The strip or plank member of claim 1 wherein said strip or plank member has four edges and includes two tongue members on two of said edges and two grooves adapted to receive tongue members, from an adjacent strip or plank member, on another two of said edges.

9. A laminated wood flooring member having a major upper surface, a major lower surface and four edges, two of said edges including tongue members extending from said two edges outwardly beyond said major upper surface, and two of said edges including machined grooves therein each of said two tongued edges including a precision-fit edge surface defined by an edge surface lying between an uppermost edge of said tongues and said major upper surface, wherein said major upper surface is substantially horizontal, said precision-fit edge surface is sloped at least 2° from vertical inwardly from said major upper surface toward said tongue member, said tongued edge and grooved edge machined such that the tongue member of an adjacent strip or plank floats freely within said groove without substantially contacting the internal machined surfaces defining the groove.

10. The laminated wood flooring member of claim 9 further including a machined surface disposed between a lowermost edge of said tongue member and said major lower surface to provide spacing between lower major surfaces of adjacent flooring members when fitted together.

11. The laminated wood flooring member of claim 9 wherein said flooring member includes a side grooved edge having a groove machined therein and an end grooved edge having a groove machined therein, said end groove machined in a central veneer layer as well as an adjacent upper layer and an adjacent lower layer so that a tongue member of an adjacent strip or plank member will fit within said end groove without contacting said side grooved edges.

12. A method of manufacturing a wood strip or plank member comprising:
   securing together a plurality of wood veneers to form a laminate having cross grained adjacent veneers and a major upper surface;
   machining an edge of said laminate to form a tongue member extending outwardly a predetermind distance from said machined edge;
   machining another edge of said laminate to form a groove in said another edge, said groove machined to receive a tongue member of an adjacent strip or plank member within said groove,
   machining said tongued edge between said tongue and said major upper surface to provide a beveled, precision-fit edge surface between said tongue member and said major upper surface, said precision-fit edge surface sloped inwardly from said upper major surface toward said tongue at an angle of at least 2° inwardly from vertical.

13. The method of claim 12 further including machining said tongued edge and said groove edge to a shape such that when major upper surfaces of adjacent strip or plank members are in contact, the adjacent strip or plank members are in contact substantially only at the major upper surfaces.

14. The method of claim 11 further including machining said tongued edge and said grooved edge such that when the major upper surfaces of adjacent strip or plank members are in contact, the tongue member floats freely within an adjacent groove of the adjacent strip or plank member.

15. A wood strip or plank member having tongue members extending centrally outwardly from two edges and grooves machined centrally within another two edges, said wood strip or plank member including a precision fit edge surface defined between a major flat surface of said strip or plank member and said tongue or groove, said precision fit edge surface inclined at an angle of at least 2° from vertical from said major surface toward an innermost edge of the tongue or groove whereby said precision fit edge surface contacts an adjacent surface of an adjacent strip or plank member substantially only at said major surface.

16. A wood strip or plank member of claim 15 wherein the tongued edge and grooved edge are machined such that when the upper major surfaces of adjacent strip or plank members are in contact, the tongue members float freely within adjacent grooves of adjacent strip or plank members.

17. A wood strip or plank member of claim 15 shaped at the tongued and grooved edges such that adjacent strip or plank members disposed in contact at said major surfaces are in contact substantially only at said major surfaces.

* * * * *

UNITED STATES PATENT AND TRADEMARK OFFICE
CERTIFICATE OF CORRECTION

PATENT NO. : 4,471,012
DATED : September 11, 1984
INVENTOR(S) : Thomas V. Maxwell It is certified that error appears in the above—identified patent and that said Letters Patent are hereby corrected as shown below:

Column 5, line 16 of the patent, "machine" should be
--machined--

Column 6, line 38 of the patent, "11" should be --12--

Signed and Sealed this

Nineteenth Day of February 1985

[SEAL]

Attest:

DONALD J. QUIGG

Attesting Officer - Acting Commissioner of Patents and Trademarks